F. E. McHUGH.
POWER TRANSMISSION DEVICE.
APPLICATION FILED MAY 3, 1915.

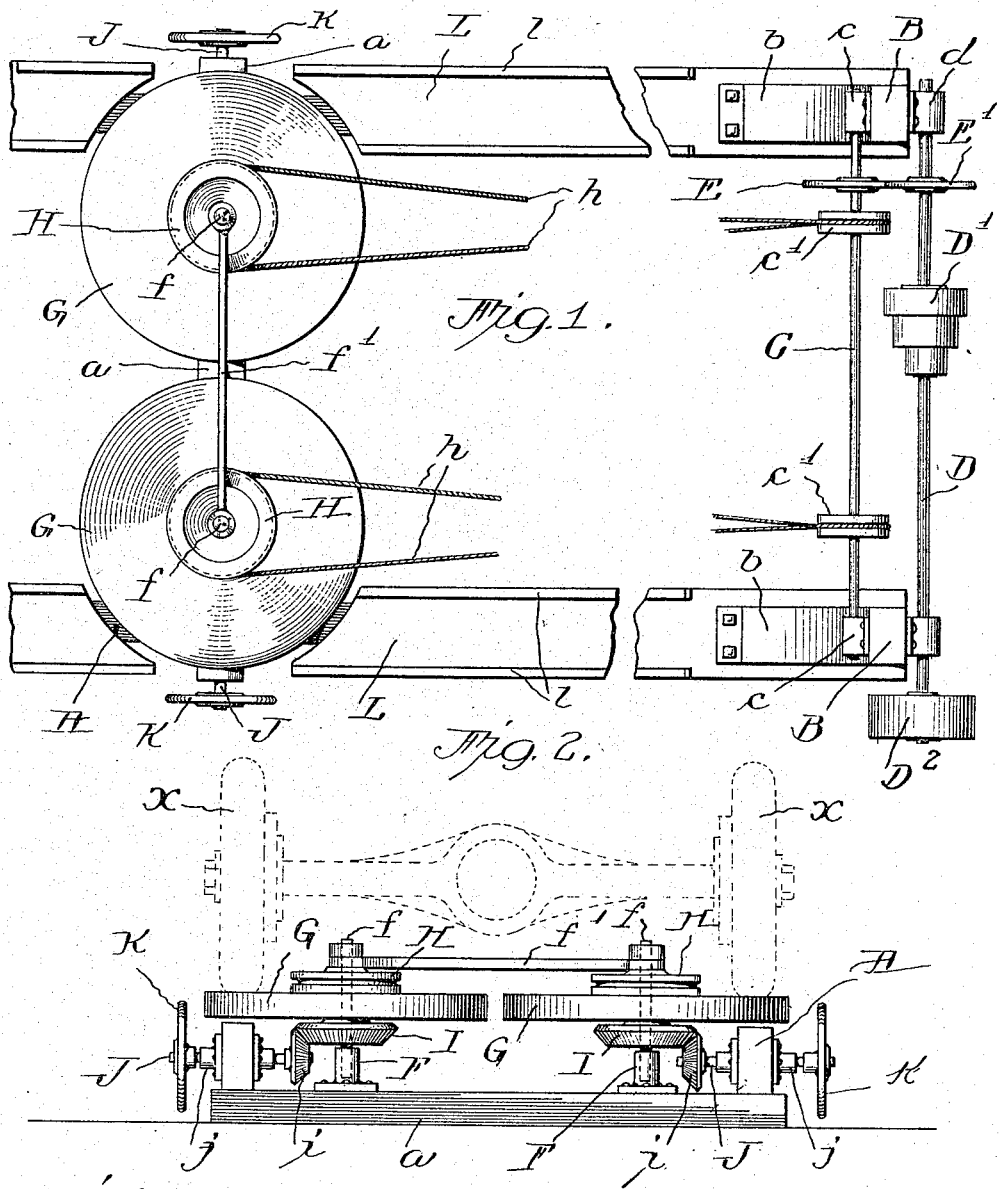

1,176,768.

Patented Mar. 28, 1916.
2 SHEETS—SHEET 2.

Witnesses:
Wm Harold Eichelman
Lillian Himmel

Inventor:
Florac F. McHugh
By Benjamin, Ross Loos & Lundy
attorneys

THE COLUMBIA PLANOGRAPH CO., WASHINGTON, D. C.

UNITED STATES PATENT OFFICE.

FELIX E. McHUGH, OF MANHATTAN, ILLINOIS.

POWER-TRANSMISSION DEVICE.

1,176,768.

Specification of Letters Patent.  Patented Mar. 28, 1916.

Application filed May 3, 1915.  Serial No. 25,596.

*To all whom it may concern:*

Be it known that I, FELIX E. McHUGH, a citizen of the United States, and a resident of Manhattan, county of Will, and State of Illinois, have invented new and useful Improvements in Power-Transmission Devices, of which the following is a specification.

My invention relates to apparatus for a transmitting power, and more particularly to an apparatus that is adapted to derive its initial power from the driving or rear wheels of a motor vehicle of either the pleasure or the commercial type.

The principal object of my invention is the construction of a power transmitting device that will operate in a very easy and simple manner and which will transmit the power to both horizontally and vertically disposed driven shafts and pulleys so as to be conveniently used for divers purposes at one and the same time.

Another object of my invention is to construct a power transmitting apparatus that will dispense with the pulleys or the pulleys and belts, that are commonly employed in devices of this kind for elevating and supporting the driving wheels of the motor vehicles.

Still further objects of my invention are the provision of a transmission device that is constructed of a minimum number of parts and so arranged that they will not readily get out of order, and the provision of a device of the character mentioned that is effective in its operation and comparatively inexpensive to manufacture.

Figure 3:
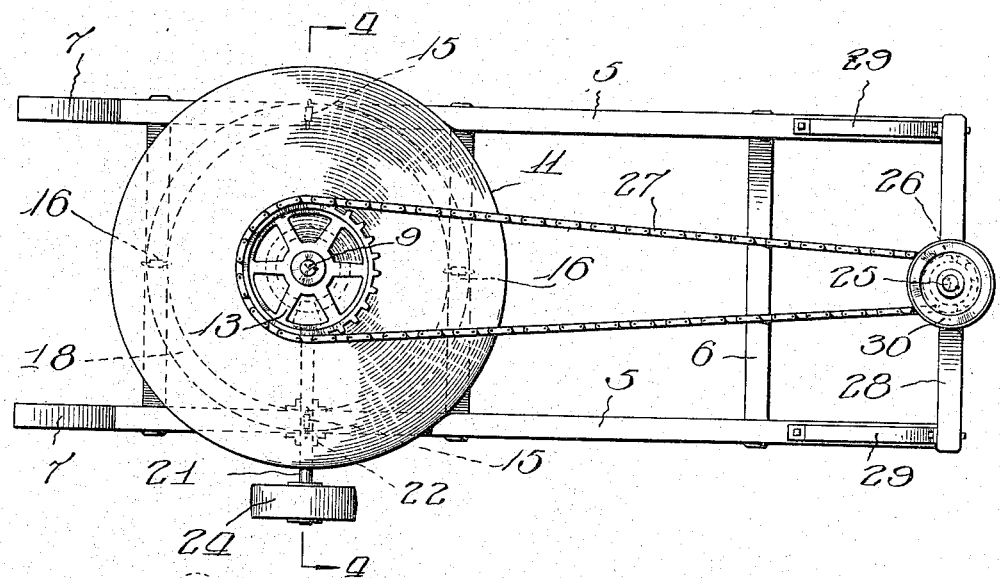
Figure 4:
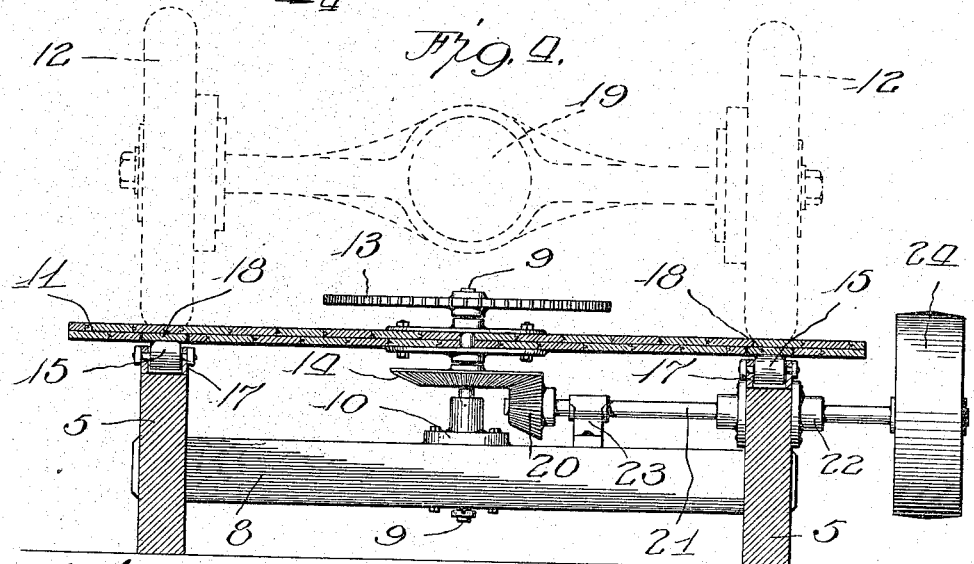

I prefer to accomplish the above and other objects in the manner and by the means hereinafter duly described and as more particularly pointed out in the claims, reference being had to the accompanying drawings, forming a part of this specification, wherein, Figure 1 is a plan of my improved power transmission device with the motor vehicle displaced. Fig. 2 is a rear elevation of my invention showing the rear or driving wheels of the motor vehicle mounted thereon. Fig. 3 is a plan of a modified form of my invention. Fig. 4 is a transverse vertical section thereof taken on line 4—4 Fig. 3 looking in the direction of the arrows and drawn to an enlarged scale.

Referring to the drawings, and more particularly to Figs. 1 and 2 thereof, it will be observed my invention comprises a substantially rectangular shaped skid A, that is adapted to provide a support for the structure. This skid consists of longitudinally disposed side-sills made of timber or the like and connected adjacent one end by a suitable cross-piece $a$. The opposite ends of the sills are provided with uprights B that are braced to the said sills by straps $b$ while adjacent said straps said uprights are each provided with transverse bearings $c$ for journaling a horizontally disposed driven shaft C therein. Other bearings $d$ are provided upon the upposite sides of said uprights in which another horizontally disposed driven shaft D is journaled which latter carries a cone-pulley $D'$ intermediate its bearings and has a large line-pulley $D^2$ on one of its extended ends. Suitable sprockets E and $E'$ are mounted upon driven shafts C and D respectively and are connected by a chain whereby the motion of the one shaft is transmitted to the other shaft and the latter driven.

Mounted preferably upon the upper surface of cross piece $a$ adjacent the side sills are two vertically disposed socket bearings F, F, that are correspondingly shaped and are adapted to support and provide bearings for relatively short vertical shafts or stubs $f$, $f$, the axes of which are substantially parallel to each other. These shafts have secured to them and carry suitable rotatable platforms or turn-tables G, G, that are adapted to be revolved in opposite directions by the rear or driving wheels X of the motor-vehicle while the upper ends of said shafts are preferably tied together by a connecting rod or link $f'$ to brace the latter and prevent lateral movement thereof. Sheaves or grooved pulleys H, H, are secured axially upon the upper surfaces of the platforms G so that they will rotate therewith, and said sheaves are connected with substantially corresponding sheaves $c'$, $c'$, secured to driven shaft C, by suitable belts or cables $h$, $h$.

Below the platforms G and between the under faces thereof and the upright bearings F, the shafts $f$ are provided with beveled gears I, I, that rotate therewith and are preferably in mesh with relatively smaller beveled gears $i$, $i$, mounted upon the adjacent extended ends of short driven shafts J, J. These driven shafts J, J, are horizontally disposed with their axes preferably in longitudinal alinement with each other and are journaled in suitable bearings $j$, $j$, in the side-sills of the skid. The ends of said short shafts extend beyond their bearings in said sills where they are provided with sprockets K, K, for driving any suitable mechanism.

In order to accommodate the front wheels of the motor-vehicle I prefer to mount suitable planks L, L, upon the upper surface of the side-sills and provide said planks with longitudinal guide flanges l, l, that prevent said front wheels moving off the skid.

From the above it will be observed that so soon as the rear wheels of the vehicle begin to drive, the platforms will be rotated in opposite directions thereby and the sheaves carried thereby will, through the belts h, h, drive the shaft C and the latter through the medium of the chain and sprockets will in turn drive the shaft D.

The apparatus illustrated in Figs. 3 and 4 of the drawings, which is a modified form of my invention, comprises a substantially rectangular shaped skid or supporting frame and a rotatable turn-table pivoted at one end thereof. The skid preferably comprises two longitudinally disposed parallel side-sills 5, 5, made of wood or any other suitable material that are on edge as shown and are connected at points intermediate their ends by transversely disposed cross-pieces or ties 6, the ends 7 of said side members adjacent the turn-table being inclined to provide a run-way over which the wheels of the vehicle are adapted to travel. Adjacent these inclined ends of the skid is a suitable crossbar 8 that extends from side sill to side-sill and in which the arbor or spindle 9 of the turn-table or platform is journaled in suitable bearings 10 secured upon the upper surface thereof. The turn-table comprises a flat circular platform 11 constructed of planking or the like and which is of a diameter sufficient to accommodate the two rear or drive-wheels 12 of the motor vehicle as shown in Fig. 2 of the drawings. The spindle 9 preferably extends through the turn-table and has a sprocket 13 secured to its upper end so as to revolve therewith, while below the turn-table and between the under surface thereof and the adjacent upper end of the bearing 10 a beveled gear 14 is secured to said spindle so as to also revolve therewith. Suitable anti-frictional rollers 15, 15, and 16, 16, are mounted in bearing boxes 17 secured upon the upper surfaces of the side-sills 5 and the cross-pieces 6, respectively, and such rollers 15 and 16 are so disposed that they are adapted to support the turn-table at four opposite sides thereof. In order to prevent friction and unnecessary wear of the turn-table I prefer to secure a metal ring 18 upon the under side thereof adjacent to and concentric with the perimeter thereof so that it registers with and rests on the rollers 15 and 16. Thus it will be observed that, when the motor of the vehicle is started, one of the drive wheels 12 of said vehicle will rotate the turn-table in one direction while the other rear wheel of said vehicle is free to travel in the opposite direction on the turn-table, owing to the operation of the usual differential gearing connecting the shafts of said wheels. By reason of the fact that the turn-table 11 is capable of rotation in either direction it will be obvious that after the motor in the vehicle is started and just prior to the throwing in of the clutch, the turn-table or the wheels of the vehicle should be given a slight movement by the operator in the direction it is desired to drive or rotate the same.

Gear 14 is in mesh with a beveled pinion 20 mounted upon the adjacent end of a transmission or driven shaft 21 journaled in horizontal bearings 22 in one of the side-sills 5 of the skid and also in a bearing bracket 23 mounted upon the upper edge of the cross-bar 8. The outer end of shaft 21 extends beyond its bearings 22 where it is provided with a pulley 24 adapted to drive a belt connected with any suitable mechanism it is desired to drive or actuate.

The cross-piece at the end of the skid farthest from the turn-table is provided with vertically disposed bearings for any upright transmission or driven shaft 25 that carries a sprocket 26 adjacent its bearing in cross-bar 28 and is driven by a chain 27 connecting the sprocket 26 with the sprocket 13 upon the upper end of the turn-table arbor or spindle 9. Upper bearings are provided for shaft 25 in a cross-piece 28 that is braced by straps 29 inclined therefrom to the upper surface of the side-sills. The upper end of said shaft 25 extends above its bearings in the cross-piece 28 and is provided with a pulley 30 that is adapted to drive a belt connected with such devices it is desired to operate.

While I have herein illustrated and described certain specific means for carrying out my invention it of course will be obvious to others skilled in the art that numerous modifications and changes may be made therein without materially departing from the spirit of my invention. I therefore desire it understood that all such changes are contemplated within the scope of my invention as expressed in the appended claims.

What I claim as new is:—

1. A power transmission device comprising a suitable frame, a horizontally disposed rotatable platform journaled thereon and adapted to support a driving wheel of a motor vehicle, a driven shaft journaled in said frame, and means operatively connecting said shaft and platform.

2. A power transmission device comprising a suitable frame, a rotatable spindle journaled thereon, a horizontally disposed platform secured to and rotatable with said spindle and adapted to support a driving wheel of the motor vehicle, a driven shaft journaled in said frame, and means operatively connecting said shaft and spindle.

3. A power transmission device comprising a frame consisting of side-sills and a transverse cross-piece connecting the same, a horizontally disposed rotatable platform journaled on said cross-piece and adapted to support a driving-wheel of a motor vehicle, a driven shaft journaled in one of said side-sills, and means operatively connecting said shaft and platform.

4. A power transmission device comprising a frame consisting of side-sills and a transverse cross-piece connecting the same, a rotatable spindle journaled in said cross-piece, a horizontally disposed platform secured to and rotatable with said spindle and adapted to support a driving wheel of a motor vehicle, a driven shaft journaled in one of said side-sills, and means operatively connecting said shaft and spindle.

5. A power transmission device comprising a suitable frame, a rotatable spindle journaled thereon, a horizontally disposed platform secured to and rotatable with said spindle and adapted to support a driving wheel of a motor vehicle, a gear secured to and rotatable with said spindle, a driven-shaft journaled in said frame, and means carried by said shaft for operatively connecting the same to said gear.

6. A power transmission device comprising a suitable frame, a rotatable spindle journaled thereon, a platform secured to and rotatable with said spindle, means for rotating said platform, a driven shaft journaled in said frame, and disposed at an angle to said spindle, and gears meshing with each other and mounted respectively upon said spindle and shaft for transmitting the motion of the former to the latter.

7. A power transmission device comprising a suitable frame, a rotatable spindle journaled thereon, a platform secured to and rotatable with said spindle, means for rotating said platform, two separate shafts journaled in said frame and adapted to be driven by said spindle, and devices separate from each other for operatively connecting said shafts with said spindle.

8. A power transmission device comprising a suitable frame, two oppositely rotatable platforms journaled thereon adjacent each other and adapted to support the driving wheels of a motor vehicle, a driven shaft journaled in said frame, and means operatively connecting said shaft and platforms.

9. A power transmission device comprising a suitable frame, two vertically disposed spindles journaled thereon, platforms secured to and rotatable with said spindles, a driven shaft journaled in said frame, and means operatively connecting said shaft and spindles.

10. A power transmission device comprising a suitable frame, two oppositely rotatable platforms journaled thereon adjacent each other and adapted to support the driving wheels of a motor vehicle, a driven shaft journaled in said frame, and means operatively connecting said shaft and platforms, consisting of sheaves mounted respectively upon said shaft and spindles and belts connecting said sheaves.

11. A power transmission device comprising a suitable frame, two vertically disposed spindles journaled thereon, platforms secured to and rotatable with said spindles, a driven shaft journaled in said frame, and means operatively connecting said shaft and spindles, consisting of sheaves mounted respectively on said shaft and spindles, and belts connecting said sheaves.

12. A power transmission device comprising a suitable frame, two spindles journaled thereon, platforms mounted on said spindles, a driven shaft journaled in said frame, means operatively connecting said spindles and shaft, stub shafts journaled adjacent said spindles, and gears operatively connecting the respective spindles and stub shafts.

Signed at Manhattan, Will county, Illinois, this 24th day of April, 1915.

FELIX E. McHUGH.

Witnesses:
R. L. STRUTHERS,
WM. McHUGH.

Copies of this patent may be obtained for five cents each, by addressing the "Commissioner of Patents, Washington, D. C."